United States Patent [19]

Horner, Jr.

[11] Patent Number: 5,117,738
[45] Date of Patent: Jun. 2, 1992

[54] CHECK VALVE AND BOOSTER SHELL

[75] Inventor: Charles B. Horner, Jr., South Bend, Ind.

[73] Assignee: Allied-Signal Inc., Morristown, N.J.

[21] Appl. No.: 570,051

[22] Filed: Aug. 9, 1990

[51] Int. Cl.⁵ .............................................. F15B 9/10
[52] U.S. Cl. ............................... 91/369.1; 91/376 R; 137/512.15; 137/854
[58] Field of Search .............. 91/369.1, 369.2, 376 R; 137/512.15, 516.15, 854, 514

[56] References Cited

U.S. PATENT DOCUMENTS

| | | | |
|---|---|---|---|
| 3,314,446 | 4/1967 | Saunders | 137/516.15 |
| 4,756,333 | 7/1988 | Heffner et al. | 137/514 |
| 4,763,689 | 8/1988 | Heffner et al. | 137/514 |

FOREIGN PATENT DOCUMENTS

| | | | |
|---|---|---|---|
| 755309 | 7/1949 | Fed. Rep. of Germany | 137/854 |
| 2119613 | 8/1978 | Fed. Rep. of Germany | 137/854 |
| 1001055 | 2/1952 | France | 137/854 |
| 1417355 | 10/1965 | France | 137/854 |

Primary Examiner—Edward K. Look
Assistant Examiner—Thomas Denion
Attorney, Agent, or Firm—Leo H. McCormick, Jr.; Ken C. Decker

[57] ABSTRACT

A brake booster (12) and check valve (36) wherein the housing (38) of the check valve (36) has a plurality of legs (52, 52'...52ᴺ) with a disc (56) located thereon. The legs (52, 52'...52ᴺ) which extend through slots (55, 55'...55ᴺ) in the shell (30) of the brake booster (12) have tabs (54, 54'...54ᴺ) that lock the housing (38) to the shell (30). The disc (56) has an annular rib (58) which engages the shell (30) to form a seal to prevent air from entering chambers (24, 40). The housing (38) is connected to a source of vacuum and a flapper (60) positioned over a plurality of openings (32, 32'...32ᴺ) in the shell (30) to allow vacuum in the chamber (40) to evacuate air from the brake booster (12).

5 Claims, 1 Drawing Sheet

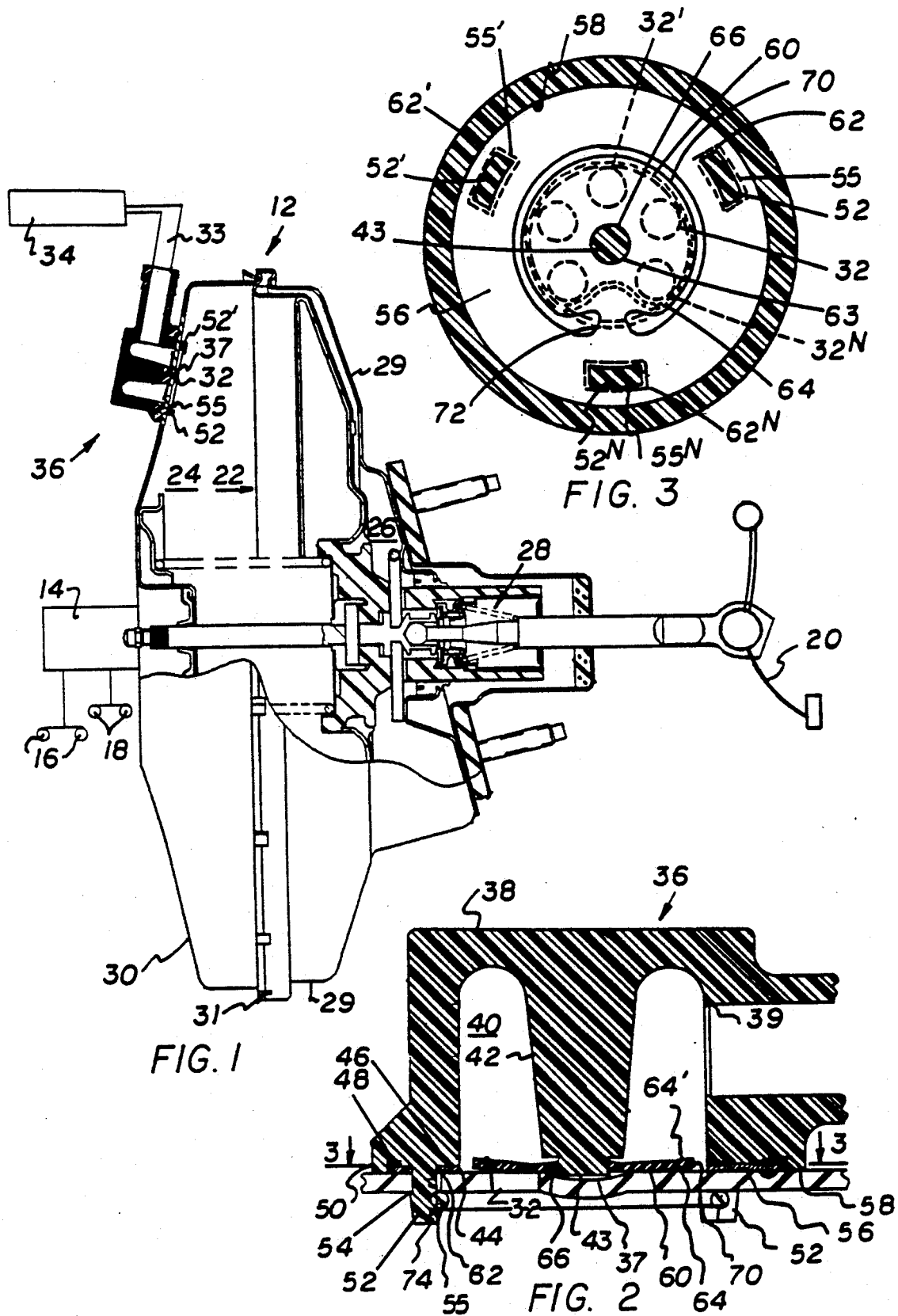

CHECK VALVE AND BOOSTER SHELL

This invention relates to a check valve and brake booster wherein a disc is held between the housing of the check valve and the shell of the brake booster on engagement of tabs on legs of the housing with the shell to form a seal that prevents air from the environment from entering the check valve while allowing vacuum to evacuate air from the brake booster.

In vehicles equipped with an internal combustion engine it is not uncommon to have a brake booster powered by a pressure differential that is produced between vacuum and air. Vacuum being created at the intake manifold and is communicated to the brake booster to evacuate air from the brake booster after each brake application. Such brake booster have an opening with a grommet located therein which holds a check valve of the type disclosed in U.S. Pat. Nos. 3,086,544; 3,228,418; 3,465,786; 3,626,978 and 3,633,613 to form an airtight connection between the brake booster and the intake manifold. These check valves perform in an adequate manner, however, in an effort to make a more compact brake booster and reduce the number of parts in a check valve the following invention was devised.

In this invention, the check valve is made of two parts, a body having a chamber therein with an outlet port connected to a source of vacuum and a resilient disc located over an opening in the chamber. Tabs on legs of the body which extend through the shell of the brake booster engage the shell to compress a flange of the disc and form a seal between the body and the shell. Thereafter, on operation of the engine vacuum produced at the intake manifold is communicated to chamber to evacuate air from the booster in anticipation of the development of a pressure differential to aid in the actuation of the brakes of the vehicle.

It is an object of this invention to provide a brake booster with a check valve wherein the resilient disc of the check valve is held between the housing of the check valve and the shell of the brake booster.

It is another object of this invention to provide a brake booster with a check valve having a plurality of legs. Tabs of the legs engage the shell of the brake booster to hold a resilient disc which controls the flow communication of air between the booster and a source of vacuum.

Another object of this invention is to provide a check valve which is easy to manufacture, simple to construct and adequately functions to control the communication of vacuum between a brake booster and a source of vacuum.

These objects should be more easily understood conjunction with the following detailed description and drawings wherein:

FIG. 1 is a schematic illustration of a brake booster having a check valve made according to the principles of this invention attached t the shell thereof;

FIG. 2 is an enlarged sectional view of the check valve of FIG. 1; and

FIG. 3 is a sectional view taken along lines 3—3 of FIG. 2.

In the brake system 10 shown in FIG. 1, a brake booster 12 of the type shown in U.S. patent application 392,876 is connected to a master cylinder 14 which supplies front wheel brakes 16 and rear wheel brakes 18 with pressurized fluid to effect a brake application of a vehicle in response to an input applied to the brake pedal 20. The brake booster 12 is powered by a pressure differential force created across wall 22 by vacuum present in chamber 24 and air presented to chamber 26 through movement of valve 28 by the brake pedal 20. Shell 30 of the brake booster 12 has a plurality of openings 32, 32'. . . 32$^N$ as best shown in FIG. 2 through which air is evacuated from the brake booster 12 by vacuum developed at the intake manifold 34 of the vehicle. A check valve 36 attached to the shell 30 allows the vacuum to evacuate air from the chamber 24 but prevents air from the environment from entering chamber 40 or chamber 24 through the openings 32, 32'. . . 32$^N$ in shell 30.

The check valve 36, as best shown in FIGS. 2 and 3, has a housing or body 38 and a resilient disc 56.

The housing 38 has a chamber 40 with an outlet port 39 connected to conduit 33 from the intake manifold 34 and an inlet port or opening 44. The housing 38 has a pintle 42 located in the chamber 40 with an end 43 that extends through the center of opening 44. A first annular groove 46 in the housing 38 radially extends from opening 44 to a second annular groove 48 adjacent a flange 50. A series of legs 52, 52'. . . 52$^N$ which extend from the body 38 have tabs 54. 54'. . . 54$^N$ thereon, respectively, (only one tab 54 is shown in the drawings) which pass through rectangular slots 55, 55'. . . 55$^N$ in the shell 30 to attach the check valve 36 to the brake booster 12.

The resilient disc 56 has a ring or semi-spherical lip 58 located in groove 48 and a flapper 60. The disc 56 is located on the legs 52, 52'. . . 52$^N$ by a series of rectangular slots 62, 62'. . . 62$^N$ to position flapper over opening 44. The flapper 60 has a central opening 66 that snaps over the end 43 of pintle 42. The peripheral edge 70 of the flapper 60 which is substantially concentric to opening 44 with the exception of hinge 72 has raised edges 64 and 64'. . . that are adapted to engage shell 30 to form a seal to retain a predetermined vacuum in chamber 24.

The shell 30 is made of metal and openings 32, 32'. . . 32$^N$, slots 55, 55'. . . 55$^N$ and detent 37 are placed therein when the shell 30 is manufactured. The check valve 36 is made of a plastic material and disc 56 is made of a rubber material. The disc 56 is positioned on housing 38 by legs 52, 52'. . . 52$^N$ passing through slots 62, 62'. . . 62$^N$. The housing 38 of the check valve 36 is thereafter attached to shell 30 by pushing legs 52, 52'. . . 52$^N$ through slots 55, 55'. . . 55$^N$ in the shell 30. Legs 52, 52'. . . 52$^N$ have a taper such that they flex on being pushed through the slots 55, 55'. . . 55$^N$. When ring or semi-spherical lip or ring 58 engages shell 30, it is compressed into groove 48 to initiate a seal and prevent communication of air from the environment into chamber 40. When flange 50 engages shell 30, the end of legs 52, 52'. . . 52$^N$ snap back to a perpendicular position and tabs 54, 54'. . . 54$^N$ engage shell 30 to lock the housing 38 to the shell 30. Under some circumstances it may be necessary to place a ring or end cap 74 on the legs 52, 52'. . . 54$^N$ to assure that tabs 54, 54'. . . 54$^N$ remain engaged with the shell 30. With the check valve 36 now attached to shell 30, the shell 30 is attached to shell 29 which already has the control valve 28 and movable wall 22 located therein. With shell 30 located on shell 29, a crimp 31 is placed on the peripheral surfaces thereof to complete the manufacture of the booster 12.

When the brake booster 12 is installed in a vehicle, the low profile of the check valve 36 allows for greater utilization of the under hood space. The outlet port 39 is attached to conduit 33 and when the engine is operating, vacuum evacuates air from the booster 12 by way of openings 32, 32'...32.$^N$ to place the booster in a ready position to establish a pressure differential with air when valve 28 is moved by pedal 20 to effect a brake application.

I claim:

1. A brake booster and check valve wherein said check valve is attached to a shell of the brake booster, said shell having a plurality of openings therein through which air is evacuated from the interior of the brake booster by way of the check valve, said check valve being characterized by a housing with having a chamber therein with an inlet port and an outlet port, said inlet port being connected to said plurality of openings in the shell and said outlet port being connected to a source of vacuum, said housing having an annular groove concentric to said inlet port and a pintle that extends from the housing through the chamber to the inlet port and a plurality of legs that extend from the housing adjacent said annular groove and a resilient disc having a central ring located on said pintle, a peripheral rib located in said annular groove and a flap attached to said peripheral rib, said plurality of legs extending through said shell to secure the housing to the shell and bring said peripheral rib into engagement with said shell to form a seal which prevents communication of air from the environment into said chamber, said flap engaging said shell to allow air to be evacuated from the shell through said plurality of openings but preventing air flow from said chamber toward the shell.

2. The brake booster and check valve as recited in claim 1 wherein said legs are characterized by tabs that engage the shell to fix the housing to the shell.

3. The brake booster and check valve as recited in claim 2 wherein said check valve is further characterized by a ring connected to said legs to prevent said tabs from moving once they engage the shell.

4. The brake booster and check valve as recited in claim 3 wherein said disc further includes a plurality of slots, said legs passing through said slots to align said flap over said openings in the shell.

5. The brake booster and check valve as recited in claim 4 wherein said flap includes a continuous raised lip that engages said shell to form a seal to prevent the communication of air into the shell, said lip having flexibility to adjust for surface differences in said shell to assure a seal is created.

* * * * *